Sept. 8, 1931.  D. NETTEKOVEN  1,822,307
ANT TRAP
Filed Oct. 30, 1929
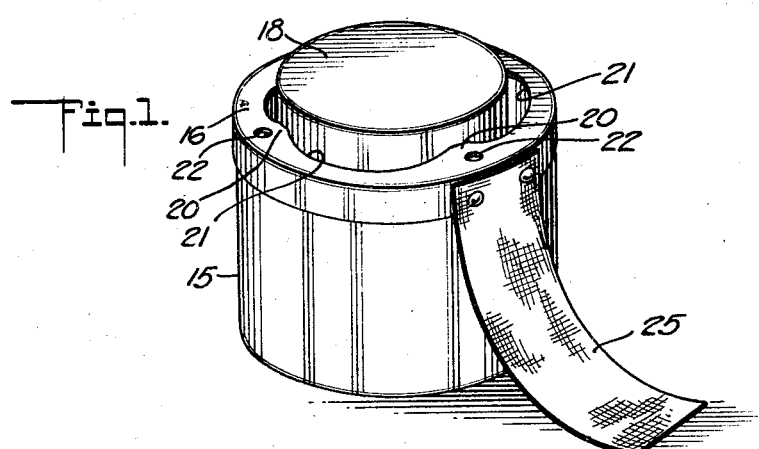
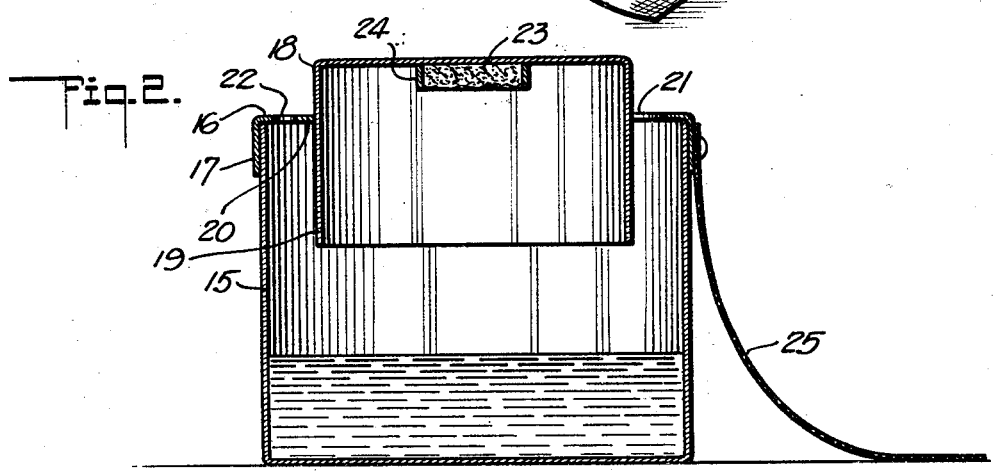
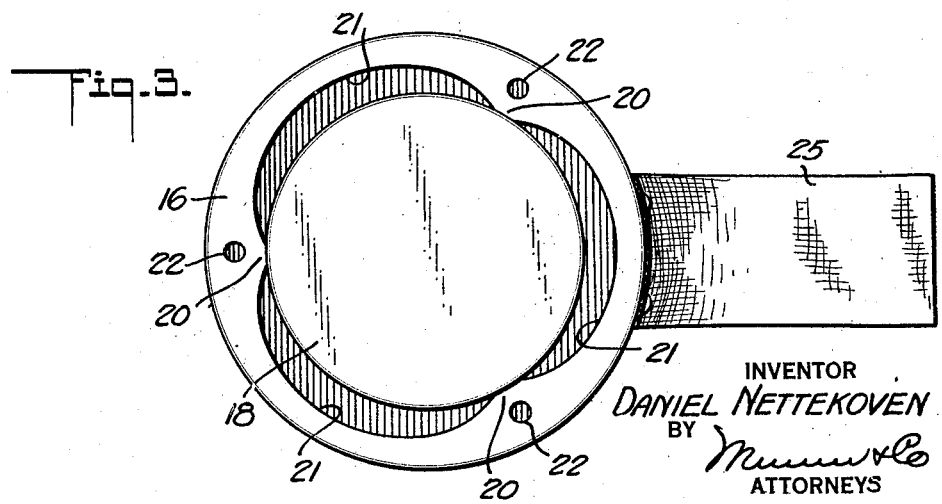
INVENTOR
DANIEL NETTEKOVEN
BY
ATTORNEYS Patented Sept. 8, 1931

1,822,307

UNITED STATES PATENT OFFICE

DANIEL NETTEKOVEN, OF ESCONDIDO, CALIFORNIA

ANT TRAP

Application filed October 30, 1929. Serial No. 403,563.

My invention relates to traps for insects, and more particularly, although not necessarily, to ant traps, a purpose of my invention being the provision of an ant trap which embodies a receptacle adapted to contain water or any other suitable liquid, a bait container on the inner side of the receptacle, and entrance openings in the receptacle so situated with respect to the bait container as to cause ants seeking the bait to crawl over surfaces disposed above the water and to assume inverted and other positions in which they are made to drop from the surfaces and thus precipitated into the water where they are exterminated.

I will describe only one form of ant trap embodying my invention and will then point out the novel features thereof in claims.

Fig. 1 is a view showing in perspective one form of ant trap embodying my invention.

Fig. 2 is a vertical sectional view of the ant trap shown in Fig. 1.

Fig. 3 is a view showing in plan the ant trap illustrated in the preceding views.

In carrying out my invention, I provide a receptacle including a body 15 of cup form which is adapted to be partly filled with water or any other suitable liquid as illustrated in Fig. 2. The top of the receptacle is provided with a cover which includes an annulus 16 provided at its outer periphery with a depending annulus flange 17 that is adapted to embrace the top of the body, as will be understood. As best illustrated in Fig. 3, the cover also includes an inverted cup-shaped member 18 secured to the annulus 16 so as to extend both above and below the annulus, but mainly below in order to form within the receptacle a tubular element 19 which is disposed directly above the water and in spaced relation to the inner walls of the receptacle body.

The inner periphery of the annulus 16 is fluted to provide radial extensions 20 which are soldered or otherwise secured to the outer periphery of the member 18 in order to fixedly secure the member in proper position within the annulus. This fluted periphery of the annulus also provides openings 21 which constitute entrances through which the ants may find access to the receptacle body. Other openings 22 in the annulus 16 provide other entrances for the ants as will be understood. The extensions 20 together with the upper side of the annulus provide surfaces over which the ants may find direct access to the member 18 from whence the ants may travel downwardly at the outer side of the member and then upwardly to the inner side so as to finally gain access to any suitable bait 23 held within a container 24.

This container 24 is in the form of a ring soldered or otherwise secured to the under side of the top of the member 18, and preferably centrally thereof so that the ants in gaining access to the bait will be caused to traverse the under side of the top of the member and to thus assume an inverted position.

It will be understood that both the receptacle body and the cover are made of a material having relatively smooth surfaces in order that the purchase of the ants when crawling over the surfaces may be rendered as insecure as possible. That the ants may readily reach the top of the receptacle, I provide a strip 25 of canvas or other suitable material which is secured to the flange 17 by riveting or in any other suitable manner, and which extends downwardly to have contact with the surface upon which the trap is supported.

In practice, the receptacle body 15 is partly filled with water as illustrated, and to a level beneath the lower end of the member 18 in order that an intervening space may be provided. With the cover in applied position and the container 24 filled with bait, ants are induced to climb the strip 25 and on to the upper surface of the annulus 16, where they either enter the receptacle through the openings 21 and 22 or over the extensions 20 and downwardly of the member 18. If they enter the receptacle through the openings 21 and 22 they finally gain access to the inner vertical wall of the receptacle body, and by reason of the fact that this wall is relatively smooth and disposed perpendicularly, the possibility is enhanced of the ants falling from the surface and into the water. In point of fact, the ants in attempting to traverse the relatively abrupt edges of the walls of the openings 21 and 22 may lose their purchase and fall into the water.

Those ants reaching the member 18 naturally descend the outer surface of the element 19, and if they are so fortunate as to not drop from this surface into the water they ascend the inner surface of the element, finally reaching the under side of the top of the member 18. In traversing this side, the ants are forced to assume an inverted position which further enhances the possibility of losing their purchase and dropping into the water before they actually reach the bait container. The outer surface of the container 24 provides another vertical surface which the ants are caused to traverse before reaching the bait, and as the ring 24 is relatively narrow it presents an edge that is difficult for the ants to traverse without losing their purchase and thus dropping into the water. The same is true of the lower edge of the element 19.

Although I have herein shown and described only one form of ant trap embodying my invention, it is to be understood that various changes and modifications may be made herein without departing from the spirit of the invention and the spirit and scope of the appended claims.

I claim:

1. An ant trap, comprising a receptacle of cup form and adapted to contain water, a cover for the receptacle including an annulus and a flange on the outer edge of the annulus encircling the top of the receptacle, an inverted cup-shaped member secured within the annulus to extend above the annulus and into the receptacle, the inner edge of the annulus being recessed to provide openings between the annulus and said member, a bait container on the underside of said member, and a piece of fabric extending up the outer side of the receptacle to the cover.

2. An ant trap, comprising a receptacle having an open top and adapted to contain water, a cover for the top of the receptacle, provided with openings, an inverted cup-shaped member secured within the cover, a bait container on the underside of said member, and a piece of fabric extending up the outer side of the receptacle to the cover.

3. An ant trap, comprising a receptacle of cup form and adapted to contain water, a cover for the receptacle including an annulus with a flange on the outer edge of the annulus encircling the top of the receptacle, an inverted cup-shaped member secured within the annulus, the inner edge of the annulus being fluted at circumferentially spaced points and formed with openings between the flutes, a bait container on the under side of said member, and a piece of fabric extending up the outer side of the receptacle to the cover and secured to the latter.

DANIEL NETTEKOVEN.